(12) United States Patent
Rehm et al.

(10) Patent No.: US 7,791,833 B2
(45) Date of Patent: Sep. 7, 2010

(54) SPINDLE MOTOR HAVING A DEEP-DRAWN BASEPLATE

(75) Inventors: Thilo Rehm, Villingen-Schwenningen (DE); Claudia Hoffmann, Rosenfeld-Brittheim (DE)

(73) Assignee: Minebea Co., Ltd., Nagano-Ken (JP)

( * ) Notice: Subject to any disclaimer, the term of this patent is extended or adjusted under 35 U.S.C. 154(b) by 210 days.

(21) Appl. No.: 11/182,598

(22) Filed: Jul. 15, 2005

(65) Prior Publication Data

US 2005/0270693 A1    Dec. 8, 2005

(51) Int. Cl.
    G11B 17/02    (2006.01)
(52) U.S. Cl. .................. 360/99.09; 360/99.11
(58) Field of Classification Search ........... 360/99.09, 360/99.11
    See application file for complete search history.

(56) References Cited

U.S. PATENT DOCUMENTS

| | | | |
|---|---|---|---|
| 5,666,239 A | | 9/1997 | Pottebaum |
| 5,977,675 A | * | 11/1999 | Oelsch .................. 310/90 |
| 6,074,098 A | * | 6/2000 | Asai et al. .............. 384/112 |
| 6,204,996 B1 | | 3/2001 | MacLeon |
| 6,205,110 B1 | * | 3/2001 | Miyamoto et al. ........ 369/266 |
| 6,252,322 B1 | | 6/2001 | Kawawada |
| 6,445,535 B1 | * | 9/2002 | Rehm .................. 360/99.08 |
| 6,456,458 B1 | * | 9/2002 | Ichiyama .............. 360/99.08 |
| 6,543,781 B1 | * | 4/2003 | Rehm et al. ............. 277/410 |
| 6,982,513 B2 | * | 1/2006 | Fujii et al. .............. 310/254 |
| 2002/0051588 A1 | * | 5/2002 | Koseki et al. ........... 384/100 |
| 2004/0000825 A1 | | 1/2004 | Hirose |
| 2004/0061404 A1 | * | 4/2004 | Fujii et al. .............. 310/216 |
| 2004/0104634 A1 | * | 6/2004 | Nishimura et al. ........ 310/90 |
| 2004/0160136 A1 | * | 8/2004 | Yoo et al. ................ 310/90 |
| 2004/0195777 A1 | * | 10/2004 | Grantz et al. ........... 277/431 |
| 2004/0264817 A1 | * | 12/2004 | Satoji et al. ............. 384/100 |

FOREIGN PATENT DOCUMENTS

| DE | 10043808 | 9/2000 |
|---|---|---|
| EP | 1148619 | 10/2001 |

* cited by examiner

*Primary Examiner*—William J Klimowicz
*Assistant Examiner*—Carlos E. Garcia
(74) *Attorney, Agent, or Firm*—Cooper & Dunham LLP

(57) ABSTRACT

The invention relates to a spindle motor having a deep-drawn baseplate and an aperture to receive and secure a bearing system to rotatably support a rotor. To avoid having to machine the bearing receiving portion of the baseplate in a complex process, the invention provides for a separate bush to be disposed in the aperture in the baseplate to receive and secure the bearing system. Compared to the baseplate, this bush can be worked in a simpler and more cost-saving process.

6 Claims, 2 Drawing Sheets

SPINDLE MOTOR HAVING A DEEP-DRAWN BASEPLATE

BACKGROUND OF THE INVENTION

The invention relates to a spindle motor having a deep-drawn baseplate, preferably for use in hard disk drives according to the preamble of claim 1.

PRIOR ART

As part of the housing of a spindle motor, the baseplate usually has an approximately central aperture to accommodate a bearing system. The bearing system comprises a bearing bush to receive a rotatably supported shaft. The rotary driven rotor is disposed on the shaft.

The bearing sleeve secured in the baseplate forms the stationary part of the bearing system, while the shaft forms the moving part of the bearing system.

It is known to make the baseplate from a deep-drawn metal part. This manufacturing method, however, only provides the baseplate with a relatively short insert length for the bearing sleeve, resulting in a relatively low press-out force. This means that the maximum impact stress of this kind of system is relatively low.

Since spindle motors for hard disk drives are high-precision motors, it is important to machine the baseplate very accurately to enable the required measurement specifications to be met. This makes the manufacture of these kinds of baseplates both complex and expensive.

SUMMARY OF THE INVENTION

The object of the invention is to improve a spindle motor having a deep-drawn baseplate in a way that lessens the above disadvantages with regard to its manufacturing complexity and the costs incurred through machining the baseplate.

This object has been achieved according to the invention by the characteristics outlined in claim 1.

Beneficial embodiments and characteristics of the invention are provided in the subordinate claims.

According to the invention, a separate bush or sleeve to receive and secure the bearing system is disposed in the baseplate. This provides the advantage according to the invention that the bearing receiving portion of the baseplate need no longer be intricately machined, this applying only to the separate sleeve, which means a simpler and more cost-saving process.

The bush is preferably bonded or pressfitted into an aperture in the baseplate. However, the bush and the baseplate could be connected to one another by means of welding or a flanged joint.

In an advantageous embodiment of the invention, the stator arrangement of the spindle motor can be disposed directly at the outer circumference of the bush. This makes it possible to position the stator arrangement very accurately since the sleeve is manufactured with high precision.

In addition, a spacer ring, on which the stator arrangement of the spindle motor is seated and secured, can be disposed at the outer circumference of the bush. However, the spacer ring can also be disposed solely on the baseplate or on both the baseplate as well as the bush.

The invention is described in more detail below on the basis of two embodiments with reference to the drawings. Further characteristics, advantages and means of application of the invention can be derived from this.

DESCRIPTION OF PREFERRED EMBODIMENTS OF THE INVENTION

Figure 1:
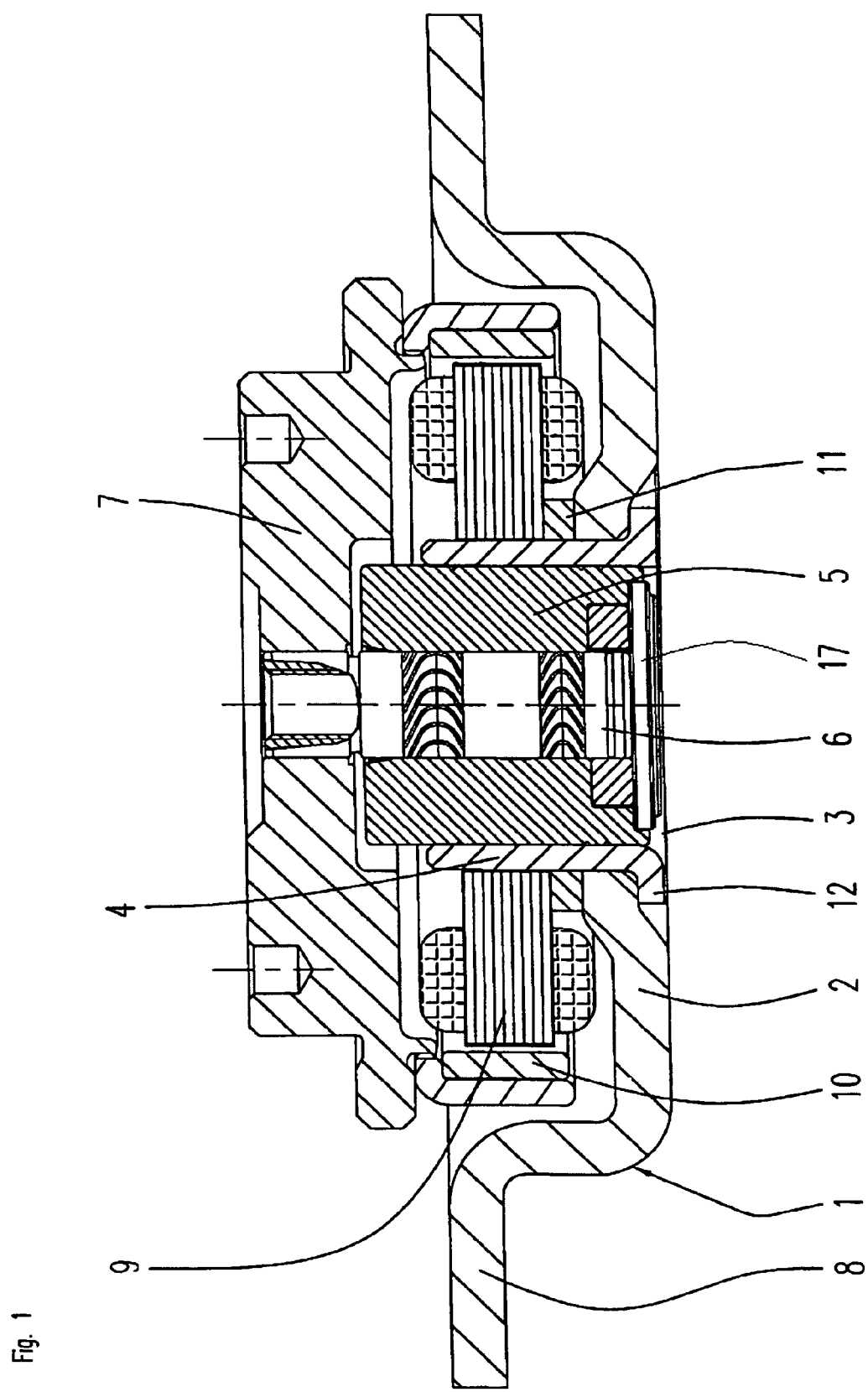
FIG. 1: a section through a first embodiment of a spindle motor according to the invention.

FIG. 1 shows a section through a spindle motor according to the invention having a deep-drawn baseplate 1.

The baseplate 1 comprises an approximately horizontal central region 2 having a circular aperture 3 in which, according to the invention, a bush 4 used to receive a bearing system is disposed. In the first embodiment according to FIG. 1, the bush 4 is secured to the baseplate through the use of known methods, such as by bonding, pressing, welding, flanging or caulking. In the connection shown in the embodiment, the lower end 12 of the bush 4 is flanged or machined accordingly. In the region of connection to the bush, the baseplate 1 is slightly raised so that the baseplate and the bush secured to it form an even base.

The illustrated bearing system is a hydrodynamic bearing system consisting of an outer bearing sleeve 5 and a shaft 6 rotatably supported within the bearing sleeve. The bearing sleeve 5 is disposed within the bush 4 and firmly fixed to the bush, for example, by bonding, pressfitting or welding. The bearing sleeve 5 is closed at one end to prevent lubricant from leaking out of the bearing system and to prevent dirt from penetrating into the bearing system. The shaft 6 carries a rotary driven rotor 7 that is approximately bell-shaped and rotates in an annular space between the bush 4 and the outer edge region 8 of the baseplate 1.

As is conventional, the electromagnetic drive comprises a stationary stator arrangement 9 and an annular permanent magnet 10 fixed to the rotor.

According to the invention, a spacer ring 11, secured to the outer circumference of the sleeve 4 and/or to the baseplate 1, is provided, the stator arrangement 9 then being seated on and fixed to the spacer ring.

Figure 2:
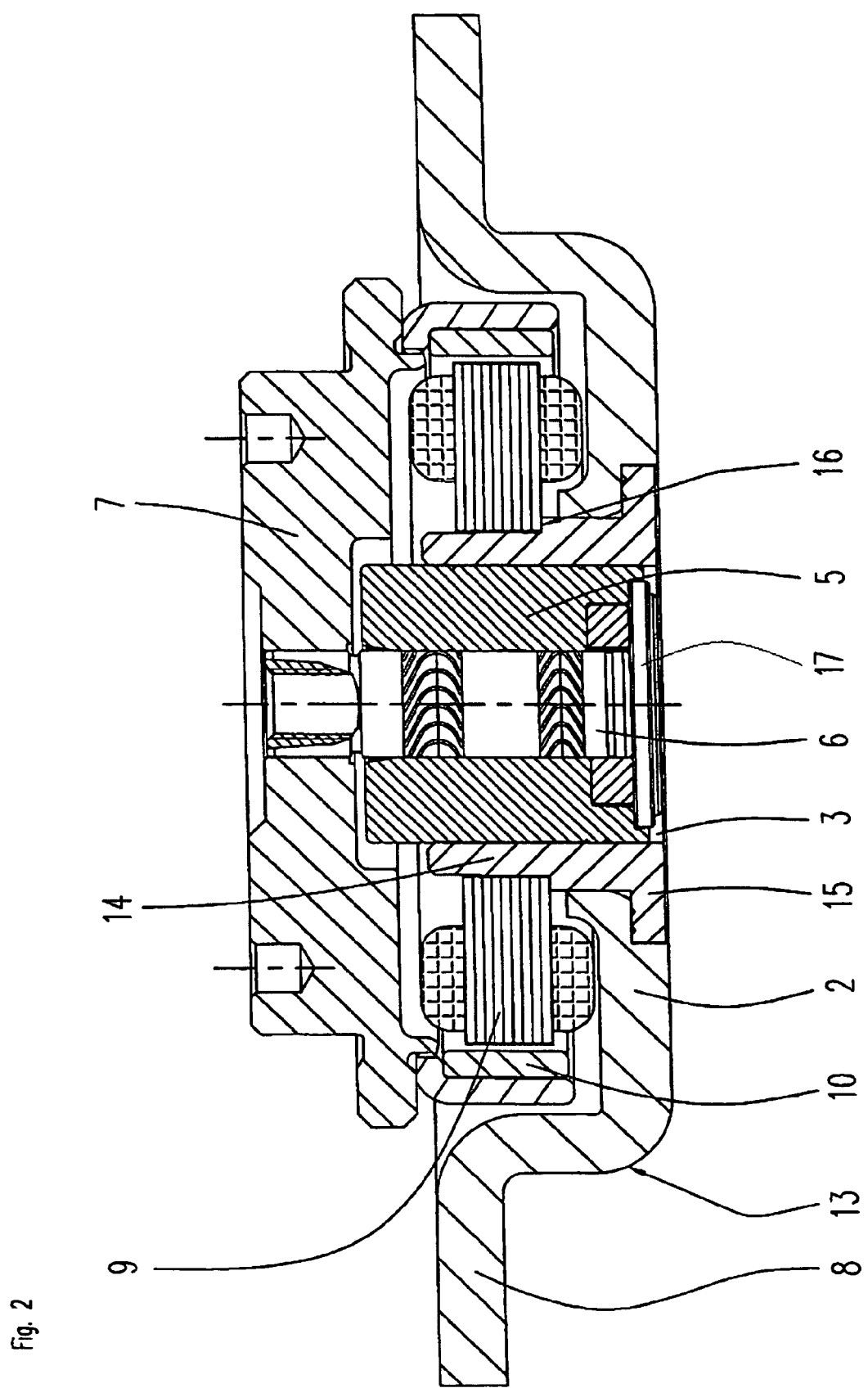
FIG. 2: a section through a second embodiment of a spindle motor according to the invention.

FIG. 2 shows an embodiment of the invention of a spindle motor whose features are almost identical to those of the spindle motor according to FIG. 1. In contrast to FIG. 1, the motor according to FIG. 2 has a bush 14 that is bonded in the aperture in the baseplate 13. One end of the bush 14 is provided with a flange 15 that is placed in an annular recess in the baseplate 13 so that the sleeve is aligned at a right angle to the baseplate. The bearing sleeve 5 of the bearing system is accommodated and secured in the bush 14.

Instead of using a spacer ring to secure the stator arrangement, the bush 14 is provided with a step 16 about halfway along its length. The stator arrangement 9 of the drive system is seated on this step 16.

IDENTIFICATION REFERENCE LIST

1 Baseplate
2 Region
3 Aperture
4 Bush
5 Bearing sleeve
6 Shaft
7 Rotor
8 Edge region
9 Stator arrangement 10 Permanent magnet
11 Spacer ring
12 End (bush 4)
13 Baseplate
14 Bush
15 Flange
16 Step
17 counter plate

The invention claimed is:

1. A spindle motor having a deep-drawn baseplate (1; 13) and an aperture (3) to receive and secure a hydrodynamic bearing system to rotatably support a rotor (7),
characterized in that
a bush (4; 14) to receive and secure the hydrodynamic bearing system is a separate part of the baseplate and is disposed and fixedly secured in the aperture (3) of the baseplate, wherein a bearing sleeve (5) is disposed within the bush, is firmly fixed to the bush, and is closed at one end by a counter plate which is in contact with the bearing sleeve,
further characterized in that
the lower end (12) of the bush (4) comprises a flange which rests on a corresponding surface of the baseplate, the corresponding surface of the baseplate being at least partially located on the underside of the baseplate, and in the region of connection to the bush (4) the baseplate (1) is slightly raised so that the baseplate (1) and the bush (4) form an even base when they are secured together, such that the bush is aligned at a right angle to the baseplate.

2. A spindle motor according to claim 1, characterized in that the bush (4; 14) is bonded, pressfitted or caulked in the aperture (3) in the baseplate.

3. A spindle motor according to claim 1, characterized in that the bush (4; 14) and the baseplate (1; 13) are connected to one another by means of a welded connection or a flanged joint.

4. A spindle motor according to claim 1, further comprising a stator arrangement (9) in the spindle motor, the stator arrangement being disposed directly at the outer circumference of the bush (4).

5. A spindle motor according to claim 4, further comprising a spacer ring (11) on which the stator arrangement (9) of the spindle motor is seated and secured, the spacer ring being disposed at the outer circumference of the bush (4).

6. A spindle motor according to claim 4, further comprising a spacer ring (11) enclosing the bush (4) on which the stator arrangement (9) of the spindle motor is seated and secured, the spacer ring being disposed on the baseplate (1).

* * * * *

UNITED STATES PATENT AND TRADEMARK OFFICE
CERTIFICATE OF CORRECTION

PATENT NO. : 7,791,833 B2 Page 1 of 1
APPLICATION NO. : 11/182598
DATED : September 7, 2010
INVENTOR(S) : Thilo Rehm and Claudia Hoffmann It is certified that error appears in the above-identified patent and that said Letters Patent is hereby corrected as shown below:

On The Title Page Please Add:
Item (30) Foreign Application Priority Data
Application No. 10 2004 036 338.2, filed in Germany on July 27, 2004

Signed and Sealed this

Fourteenth Day of December, 2010

David J. Kappos
*Director of the United States Patent and Trademark Office*